United States Patent [19]
Ruegg

[11] 3,892,509
[45] July 1, 1975

[54] INJECTION MOLDING MACHINE HAVING SEPARATE MOLD MOVING AND MOLD CLOSURE FORCE APPLYING MEANS WHICH ARE RESETTABLE

[75] Inventor: Edwin Ruegg, Netstal, Switzerland

[73] Assignee: Maschinenfabrik und Giesserei Netstal AG., Switzerland

[22] Filed: Oct. 31, 1973

[21] Appl. No.: 411,205

[30] Foreign Application Priority Data
May 23, 1973 Switzerland.................. 7307/73

[52] U.S. Cl. ............ 425/136; 425/154; 425/450.1
[51] Int. Cl................................................. B29f 1/06
[58] Field of Search .......... 425/137, 150, 154, 167, 425/450 R, 136

[56] References Cited
UNITED STATES PATENTS

| | | | |
|---|---|---|---|
| 3,247,545 | 4/1966 | Sullivan | 425/450 X |
| 3,423,502 | 1/1969 | Stimpson | 425/150 X |
| 3,507,012 | 4/1970 | Aoki | 425/242 |
| 3,736,087 | 5/1973 | Ruegg | 425/167 X |
| 3,765,812 | 10/1973 | Sugiyama | 425/150 |

Primary Examiner—Francis S. Husar
Assistant Examiner—David S. Safran
Attorney, Agent, or Firm—McGlew and Tuttle

[57] ABSTRACT

An injection molding machine comprises a fixed mold clamping plate and a movable mold clamping plate which is movable toward and away from the fixed clamping plate and is connected both to a guide housing which has a piston portion movable in a hydraulic motor cylinder and also to a cross head piston which is guided in the guide housing and which is operated by a rotary drive including a rotatable crank shaft which is connected to the cross head piston through a connecting rod. The piston portion of the guide housing is hollow and it carries a bushing. A power member having a screw portion which is rotatable is actually displaceable upon rotation in respect to the bushing. Spring means are provided between the bushing and a collar carried on the power member so that the piston and hence the guide housing connected thereto will be moved to a neutral position after each operation of the device. The neutral position may be shifted by rotating the power screw to change the position of the collar relative to the bushing.

3 Claims, 3 Drawing Figures

3,892,509

INJECTION MOLDING MACHINE HAVING SEPARATE MOLD MOVING AND MOLD CLOSURE FORCE APPLYING MEANS WHICH ARE RESETTABLE

BACKGROUND OF THE INVENTION

1. Field of the Invention

This invention relates in general to a construction of injection molding machines and in particular to a new and useful injection molding machine having separate drive mechanisms for moving the mold to a closed position and for applying the mold closing force and which also includes means for orienting the mold closing drive piston and the guide housing of the movable clamping plate of the mold in a neutral position after operation thereof.

2. Description of the Prior Art

At the present time mold closing devices are known which include separate drive mechanism for moving the movable clamping plate of the mold to a closed position and for subsequently applying a closing force to the clamping plate. The mechanism which produces both a closing force and the opening of the mold is enclosed in a guide housing and it includes a cross head piston which is guided in the guide housing wall. The guide housing is firmly connected with a hydraulic piston which moves in a hydraulic cylinder coaxial to the cross head piston and it produces a closing movement of the movable mold clamping plate. In the known device means are provided for moving the operating parts into a neutral position after the return of the housing of the closing mechanism when the performed closing or opening operation is finished. In the known construction means are provided in the form of springs which act on a fixed arm outside of the housing which extends radially to the axis of the drive piston. A disadvantage of the known construction is that the parts are not always accurately repositioned and the forces acting to restore the parts are sometimes not centered.

SUMMARY OF THE INVENTION

In accordance with the present invention there is provided a injection molding machine particularly for plastics which includes separate drive mechanisms for closing the mold and for applying a closing force thereto and which includes spring means which act concentrically to the drive piston for closing the mold to return the guide housing of the actuating mechanism into a neutral position after the closing force which is applied to the mold is released. The construction is such that the forces do not act eccentrically upon the housing and it provides a simple manner of maintaining the height or depth setting of the mold. The arrangement includes a spring connection between an axially movable power setting member and a bushing contained in a movable piston of the hydraulic motor for moving the mold clamping plate toward a closing direction. The power member advantageously includes a threaded portion which is rotated to displace it axially for readjusting the position of the drive piston and guide housing in accordance with opeerational requirements. The invention provides a compact and simple arrangement for effecting the desired control and one which provides a uniform and even movement of the associated parts.

Accordingly it is an object of the invention to provide an improved injection molding machine which includes a separate mold moving device and closing mechanism and which has means for automatically returning the parts to a neutral position after a closing force is applied and which permits adjustment of the parts for the operating requirements of mold closure.

A further object of the invention is to provide an injection molding device which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
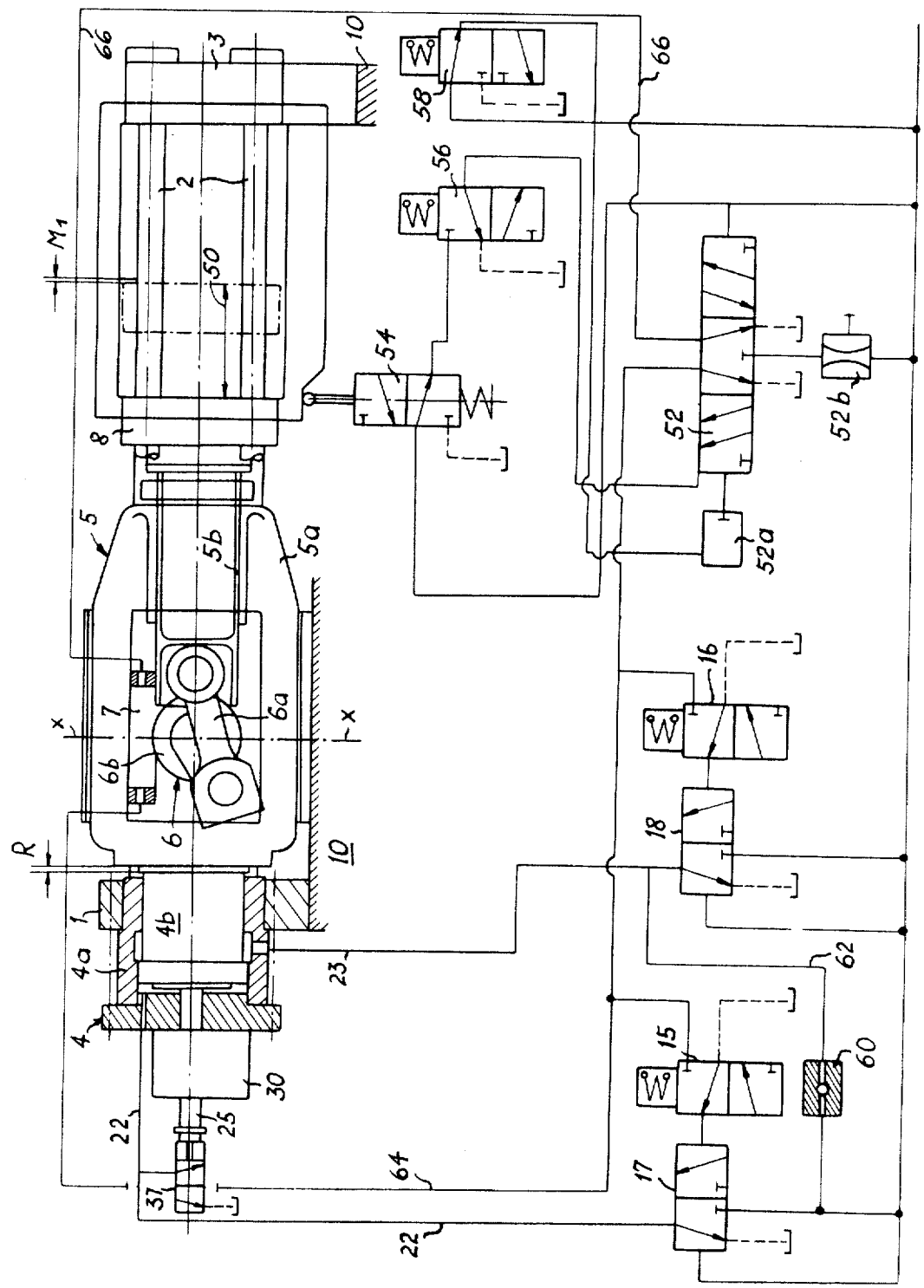
FIG. 1 is a partial side elevational and partial axial sectional view of an injection molding machine with the various hydraulic control mechanisms being schematically indicated and which is constructed in accordance with the invention.
Figure 2:
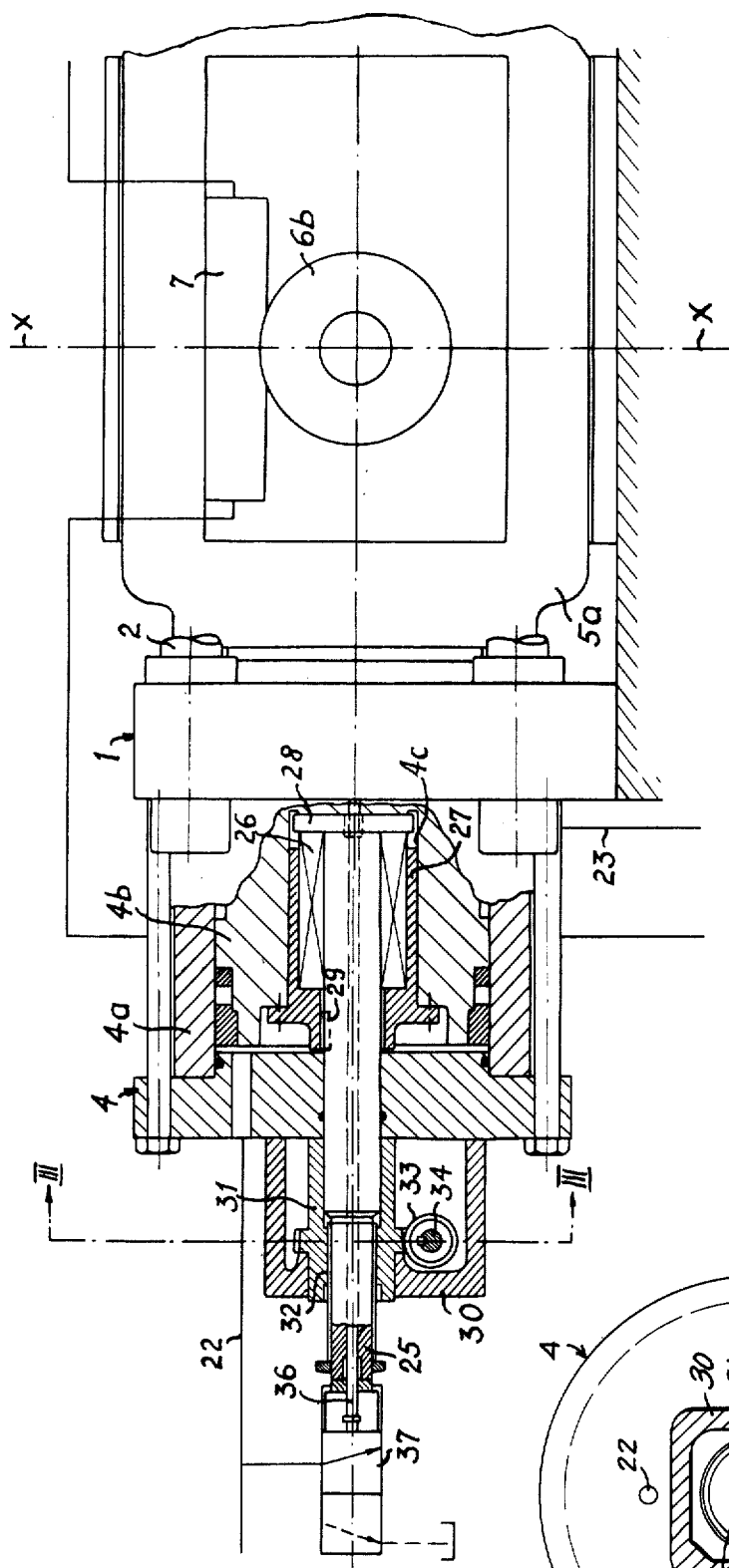
FIG. 2 is an enlarged partial sectional view of the portion of the mechanism shown in FIG. 1.
Figure 3:
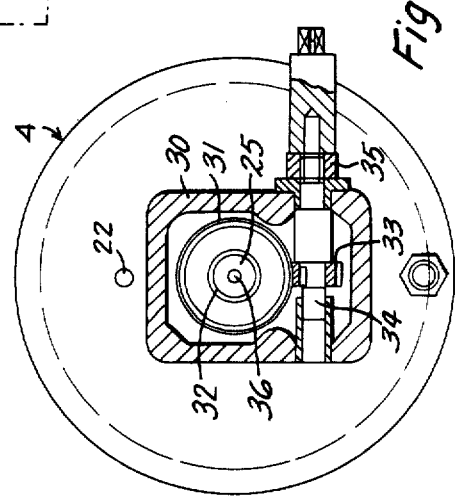
FIG. 3 is a section taken along the line III—III of FIG. 2.

Referring to the drawings in particular, the invention embodied therein comprises an injection molding machine which includes a support yoke 1 which is mounted on a fixed base or foundation 10 along with a fixed mold clamping plate 3. The hydraulic piston device or drive motor 4 for moving a movable mold clamping plate 8 toward and away from the fixed clamping plate 3 includes a fluid pressure cylinder 4a having a differential piston 4b therein which is movable backwardly and forwardly in order to produce the closing force. The differential piston 4b is formed on an end or is rigidly connected to an end of a guide housing generally designated 5 which has an opposite end 5a which forms a guideway for a crosshead piston 5b which moves backwardly and forwardly and is coaxially aligned with the piston 4b. The crosshead piston 5b is driven by a rotatable crank shaft generally designated 6 which includes crank arm 6b which is connected via connected rod 6a to the crosshead piston 5b. The crank shaft 6 is driven by a rotary piston drive 7 which is schematically indicated. The rotary piston drive is of a known type which includes means for continuously adjusting the angle of rotation between predetermined positions.

The operating parts for the crosshead piston 5b are contained within a guide housing 5a. The rotary drive 7 forms the drive for the closing or opening travel of the movable clamping plate 8 which is fixed on the crosshead piston 5b. The movable mold clamping plate 8 is guided on rods 2, 2 which are supported on the foundation 10.

In accordance with a feature of the invention the piston 4b is provided with a bore 4c in which is positioned a bushing 27. The bushing 27 is secured to the piston against rotation in respect thereto and a power member 25 is axially slidable in the bushing 27 and is keyed to the bushing by means of a key 29 in a manner such that axial displacement is possible but not rotative relative movement. The inner end of the power member 25 is provided with a collar 28 which is spaced from the bottom or inner end of the bushing 27. In accordance with a feature of the invention restoring spring means in the form of a spring pack 26 is mounted around the power member 25 between the bottom of the bushing 27 and the collar 28. The spring pack 26 is advantageously a so-called Schnorr-spring pack and it acts to bias the collar relative to the bushing 27 so as to restore the operating parts including the piston 4b and guide housing 5 and the movable mold clamping plate 8 so that the crank shaft 6 carried by the guide housing 5 remains oriented in the axis X-X. The action of the spring pack 26 in both axial directions of the piston axis positively causes a return of the housing 5a and the parts connected thereto to a prefixed neutral position X as soon as the closing force is released.

A screw drive box 30 is fixed on the outside of a cylinder 4a and it includes a worm gear 31 having an inner thread 32 which is threaded to the power member 25. The worm gear 31 meshes with a pinion 33 which is fixed to a shaft 34 whose actuating end protrudes out from the box 30 and can be fixed by means of a fixing nut 35 in its respective angular position. When the nut is loosened the pinion 33 and the worm gear can be turned by the shaft 34. The rotation of the worm gear 31 produces an axial shifting movement of the power member 25 and changes the position of the collar 38 in respect to the bottom of the bushing 27 and therefore also changes the position of the piston 4b and the guide housing 5 through the action of the connecting spring 26. By this manner the closing distance or the depth of the mold may be varied. The stroke of the movement of the movable clamping plate 8 of the mold is indicated by the double arrow 50.

A control rod 36 extends coaxially through the hollow power member 25 and the inner end of this rod 36 is affixed to the piston 4b. The outer end of the rod serves to actuate a relief valve 37. The arrangement is such that the maximum stroke of the piston 4b is equal to the control path covered by the pressure fluid in the valve 37. Should the control path be excessive for example when the gap indicated $M_1$ is adjusted to be too large, the pressure in the cylinder 4a is released because the valve 37 is connected in parallel to the line 22 and the pressure in the lines 22 and 23 drops to zero, that is the mold locking motion comes to a standstill.

The means for actuating the various operative parts are schematically indicated and include switching elements for operating the fluid controls affecting the charging of the rotary piston 7 and the pressure cylinder 4a together with associated valves 17, 15, 18, 16, 52, 52a, 52b, 54, 56 and 58. The system also includes a crossover control element 60 in a crossover line 62. The various control elements are connected by the main connecting lines 64 and 66 for the rotary piston drive 7 and 22 and 23 for the fluid pressure cylinder 4a.

While a specific embodiment of the invention has been shown and described in detail to illustrate the application of the principles of the invention, it will be understood that the invention may be embodied otherwise without depating from such principles.

I claim:

1. An injection molding machine, comprising a fixed mold clamping plate, a movable mold clamping plate movable toward and away from said fixed mold clamping plate, first guide means for guiding said movable mold clamping plate for backward and forward movement in respect to said fixed mold clamping plate, a movable guide housing having one end connected to said movable mold clamping plate, a crosshead piston being movable on said guide housing and having an end connected to said movable mold clamping plate for effecting closing and opening movement thereof, a hydraulic motor including a cylinder and a drive piston movable in said cylinder and being connected to said guide housing for displacing said guide housing with said movable clamping plate to apply a closing force to said mold, a rotary drive assembly within said guide housing including a rotatable crank shaft connected to said crosshead piston to displace said piston and said movable clamping plate in closing and opening directions, a fixed power member axially arranged in respect to said drive piston and spring means acting between said fixed power member and said drive piston and concentrically arranged in respect to said drive piston and acting on said piston along the axis thereof to restore it to a neutral position after the closing force is applied to the movable mold clamping plate by said drive piston, said drive piston being provided with a hollow portion having a bushing therein, said power member extending through said bushing and through said cylinder and terminating in a collar located in spaced relationship to the interior of said bushing, said spring means comprising a spring pack located between said collar and said bushing.

2. An injection molding machine according to claim 1, wherein said power member is mounted within said bushing for axial displaceable movement but is affixed thereto against rotation in respect thereto, said power member including a threaded portion, a threaded gear member engaged over said threaded portion and means for rotating said gear member to shift said power member axially to displace said collar toward and away from said bushing.

3. An injection molding machine, comprising a fixed mold clamping plate, a movable mold clamping plate movable toward and away from said fixed mold clamping plate, first guide means for guiding said movable mold clamping plate for backward and forward movement in respect to said fixed mold clamping plate, a movable guide housing having one end connected to said movable mold clamping plate, a crosshead piston being movable on said guide housing and having an end connected to said movable mold clamping plate for effecting closing and opening movement thereof, a hydraulic motor including a cylinder and a drive piston movable in said cylinder and being connected to said guide housing for displacing said guide housing with said movable clamping plate to apply a closing force to said mold, a rotary drive assembly within said guide housing including a rotatable crank shaft connected to said crosshead piston to displace said piston and said movable clamping plate in closing and opening directions, a fixed power member axially arranged in respect to said drive piston and spring means acting between said fixed power member and said drive piston and concentrically arranged in respect to said drive piston and acting on said piston to restore it to a neutral position after the closing force is applied to the movable mold clamping plate by said drive piston, said drive piston being provided with a hollow portion having a bushing therein, said power member extending through said bushing and through said cylinder and terminating in a collar located in spaced relationship to the interior of said bushing, said spring means comprising a spring pack located between said collar and said bushing, said power member being mounted within said bushing for axial displaceable movement but being affixed thereto against rotation in respect thereto, said power member including a threaded portion, a threaded gear member engaged over said threaded portion and means for rotating said gear member to shift said power member axially to displace said collar toward and away from said bushing, and a control rod extending through said power member and connected to said piston, and valve means in the path of said control rod being actuable by displacement of said control rod by said piston beyond a predetermined amount to unload said drive piston to interrupt the closing movement thereof in the event that the setting of said drive piston in relation to said movable clamping plate member is excessive.

\* \* \* \* \*